July 1, 1930.　　O. THOMAS ET AL　　1,768,645
TRACTOR
Filed Oct. 2, 1922　　6 Sheets-Sheet 1

Inventors.
Owen Thomas and
Paul R. Thompson,
by Wallace R. Lane
Atty.

July 1, 1930.    O. THOMAS ET AL    1,768,645
TRACTOR
Filed Oct. 2, 1922    6 Sheets-Sheet 4

Inventors:
Owen Thomas &
Paul R. Thompson,
by Wallace R. Lane.
Atty.

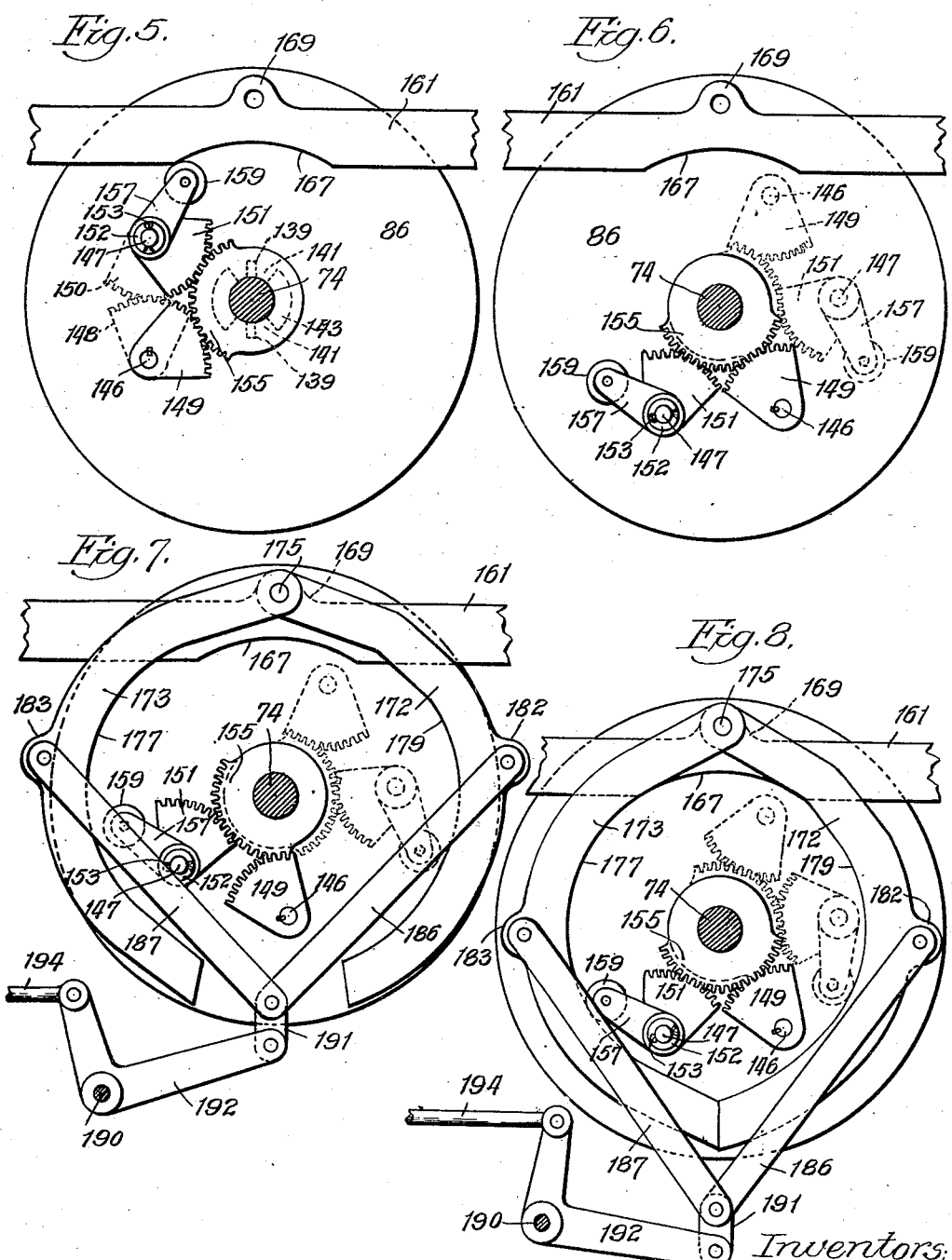

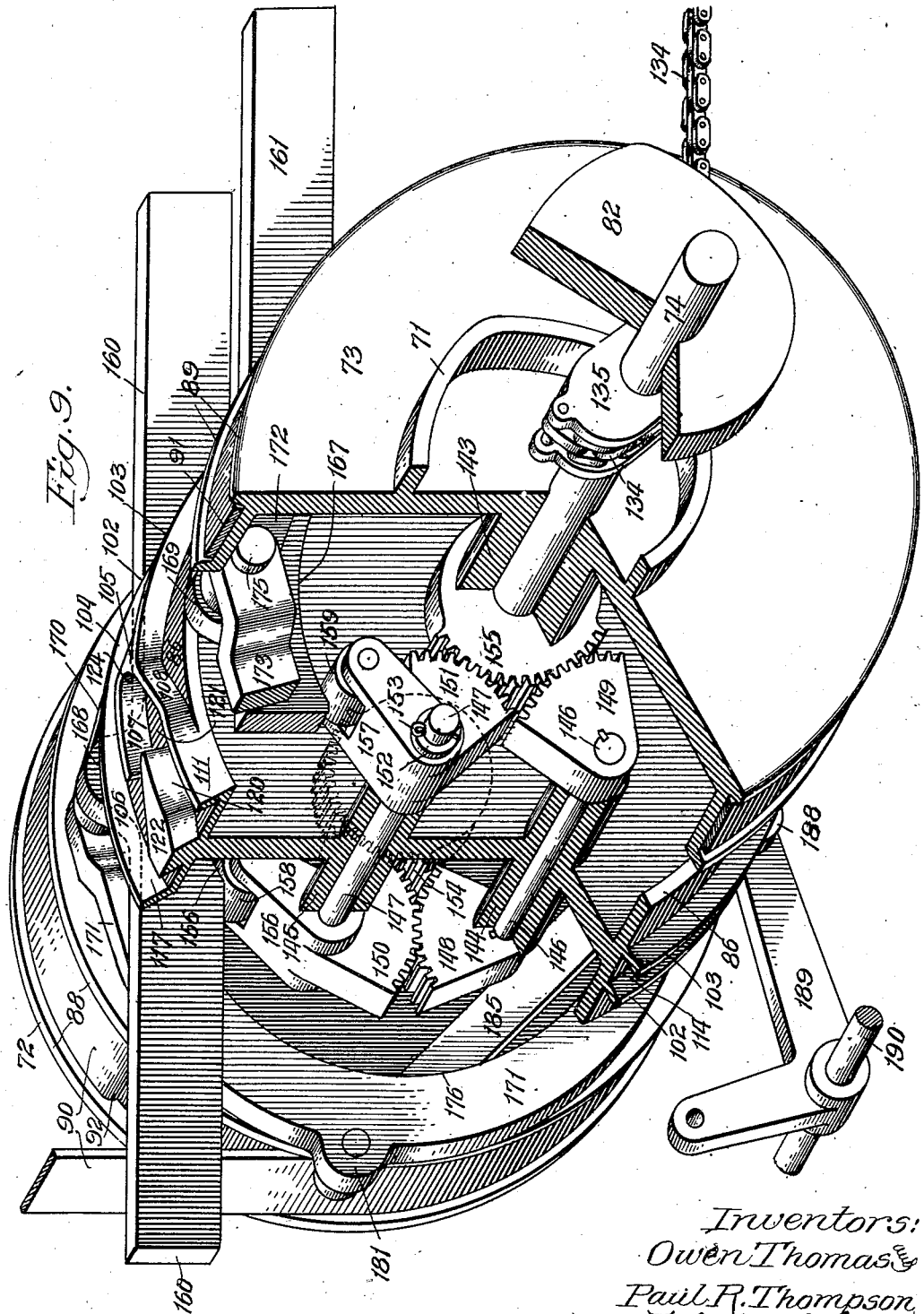

Patented July 1, 1930

1,768,645

UNITED STATES PATENT OFFICE

OWEN THOMAS, OF CLEVELAND, OHIO, AND PAUL R. THOMPSON, OF LA PORTE, INDIANA, ASSIGNORS TO ADVANCE-RUMELY COMPANY, OF LA PORTE, INDIANA, A CORPORATION OF INDIANA

TRACTOR

Application filed October 2, 1922. Serial No. 591,861.

The present invention relates to tractors, and more particularly to the class of tractors known as the rein drive or rein controlled tractors.

To those accustomed to driving horse drawn agricultural machines and implements certain pulls and let-ups on the reins always effected certain given results, as for example, a let-up on both reins usually resulted in the horses and the device drawn by them moving forward; a pull back on both reins resulted in a straight backing up of the horses and implements; and a pull on one rein more than the other or a let-up on the one more than the other resulted in a turning to the right or left. With the advent of tractors and to the end that those theretofore accustomed to the previous methods of handling of the reins and the controls effected thereby, might be able to as readily operate the tractors, the present invention has among its objects the provision of novel means whereby the tractor may be made to behave in the same manner as horses were previously made to act and to effect the same results by the same method of handling reins connected to the mechanism of control; to provide tractor operating mechanism controlled by two reins each of which operates a separate clutch and brake for each wheel; to provide driving, clutching and braking mechanism which may operate together or independently to drive both wheels or either wheel of the tractor, as desired; to so construct the control mechanism that the rein control permits either wheel to be driven forward or in reverse with the other wheel being either driven in the same direction or stopped; to provide means for controlling or operating each of the main clutches by a single line or rein, such as a left hand rein controlling the left hand drive wheel and the right hand rein controlling the right hand drive wheel; to construct such means with a retractile member, such as a spring, for drawing the reins forward, as well as actuating the control mechanism, so that either rein may be released to effect a clutching of the clutch to which the rein is connected for forward travel of the tractor or pulled back to release that clutch, while the other rein is released for forward travel or pulled back to release the clutch to which it is connected; to so construct the control means that whenever either rein is pulled back past the position necessary to release the clutch, the other rein will be brought back to the release position, and at the same time the forward and reverse transmission gearing and clutch mechanism in the main shaft of the tractor engine, will be reversed; to so construct the device that the wheels may be driven at different rates either forwardly or backwardly, or either wheel may be thrown out of driving engagement while driving the other wheel, for pivot turning; to provide the device with means whereby the wheels cannot be driven in opposite directions; to provide a rein operated control cam or gate which necessitates the passing of the control means through a neutral point when the reins are operated together for changes between forward and reverse driving; to provide the control means with differential mechanism, preferably gearing, for effecting changes in the different controls; to render the device fool-proof so that a mis-operation will not occur; to make provisions for avoiding a cramp between the tractor and the implement hitched thereto, whether pushed or drawn by it; to associate movable means, including a cam race, with the gate mechanism, that the controlling action of the control mechanism may be modified, when there is a cramp in the hitch between the tractor and the attached implement, so that the hitch will be automatically straightened out to remove the cramp; to provide means, such as swivelled idlers over which the reins may pass, to accommodate for the angularity that may be present between the tractor and the reins extending to the driver's seat on the attached implement; and such further objects, advantages and capabilities as will later more fully appear and are inherently possessed by the device.

In the accompanying drawings illustrating an embodiment of the invention;

Figs. 5 and 6 are fragmentary views of part of the controlling mechanism in different positions of action;

Figs. 7 and 8 are similar views together with the modifying mechanism for a cramped hitch; and Fig. 9 is a perspective view, with parts shown in broken sections, of the controlling mechanism.

Figure 2:
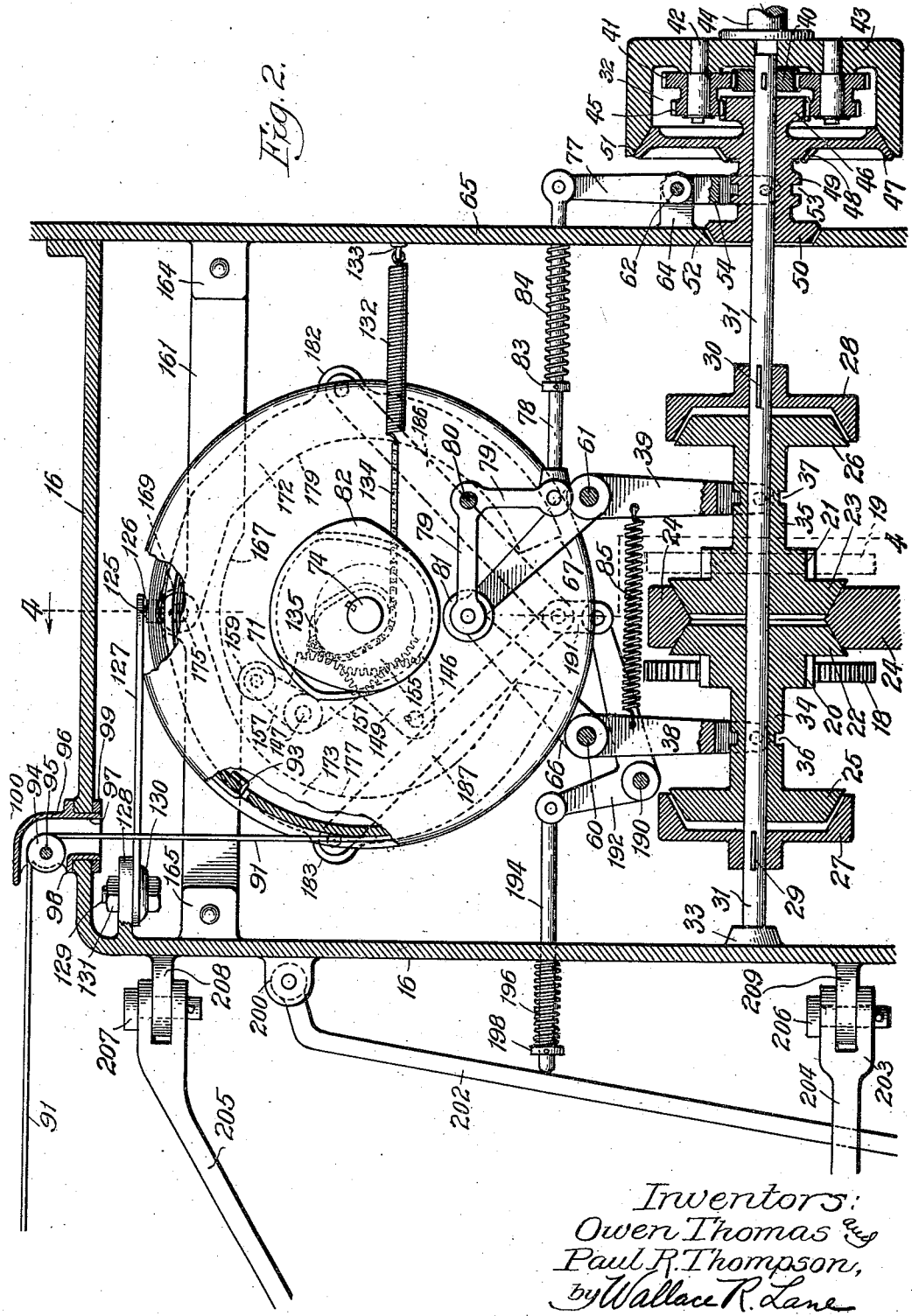
Fig. 2 is a view partly in vertical section and partly in side elevation of the control and driving mechanism of the tractor.

Referring more particularly to the drawings, the invention is shown as comprising an engine 1, preferably of an internal combustion type, having the usual operating and control mechanism peculiar thereto. On both sides of the engine frame are integrally formed gearing housings 2 and 3 to which are rigidly connected tapering axle hubs 4 and 5 having bull wheels 6 and 7 rotatably mounted on the outer ends of the hubs. Axle shafts 8 and 9 are located within the hubs 4 and 5 and are connected at their outer ends to the wheels 6 and 7 and at their inner ends to the worm gears 10 and 11 driven by worm screws 12 and 13 carried at the forward ends of the shafts 14 and 15, gears 10 and 11 and worms 12 and 13 being respectively housed in the housings 2 and 3. A rearwardly extending casing 16 is connected, in any suitable manner, through housing section 17 to the gear houses 2 and 3, the casing 16 and section 17 serving to house the operating and controlling mechanism of the tractor. The shafts 14 and 15 extend into this casing and have fixed at the rear ends thereof, spur gears 18 and 19 respectively in mesh with spur pinions 20 and 21 which are respectively rigid with brake members 22 and 23 cooperable with a fixed part 24 of the casing 16, and also respectively rigid with brake elements 25 and 26 cooperable respectively with clutch elements 27 and 28 fast, as by keys 29 and 30, to a propeller shaft 31, the members 20, 21, 22, 23, 25 and 26 being freely or loosely and rotatably mounted on the propelling shaft 31 connected, for driving operation, to the engine 1 through a clutch mechanism 32, of any suitable construction, but preferably of the planetary type. The rear end of the shaft 31 has a thrust bearing 33 forming part of the casing 16. Rigidly formed, and preferably integrally, between the gear 20 and clutch element 25, as well as between gear 21 and clutch element 26, are sleeves 34 and 35 having shipper grooves 36 and 37, respectively, in which operate shipper forks or yokes 38 and 39 for shifting the sleeves 36 and 37 together with their connected members 20 22 and 25, and 21, 23 and 26, as clearly shown in Fig. 2 of the drawings. The sleeves 34 and 35, together with gears 20 and 21, brake elements 22 and 23, and clutch elements 25 and 26 are slidable on the shaft so that when the yokes 38 and 39 operate to shift the sleeve 34 to the right and sleeve 35 to the left, as viewed in Fig. 2 of the drawings, the brakes 22—24 and 23—24 are applied, and the clutches 25—27 and 26—28 are unclutched so that both gears 20 and 21, as well as the driving mechanism geared to them, are brought to a stop, or if the brakes are slipping, more or less, to slow down the driving effect of the tractor. When the sleeves 34 and 35 are moved reversely, the clutches 25—27 and 26—28 are clutched and brakes 22—24 and 23—24 are disengaged so that the shaft 31 drives the gears 20 and 21 and hence the driving mechanism geared thereto. It is to be understood, however, that the slidable members, in moving from and to clutching and braking positions, pass through neutral positions in which the clutches and the brakes are idle or disengaged or either the clutches or the brakes have a slight frictional engagement or slippage. This is of utility where the tractor is to be turned to the left or right, as the case may be, so that one bull wheel may be driven at a different rate of speed, as by retarding it, in its driving operation with reference to the other bull wheel. When making a right hand turn the yoke 38 may be operated to clutch in the members 25—27 for driving the left hand wheel, and the yoke 39 left in braking position when the members 23—24 are engaged and clutch members 26 and 28 are idle or disengaged, whereby the right hand wheel is held stopped so that the tractor may pivot about it, or may be operated to shift the sleeve 35 so that either or both the brakes 23—24 and clutch 26—28 will have more or less slippage whereby the right hand wheel will be driven slower than the left hand wheel. Likewise, for making a left hand turn the yoke 39 may be operated to clutch in the clutch members 26—28 for driving the right hand wheel, and the yoke 38 may be operated to shift the brakes 22—24 and clutch 25—27 into a neutral position or to positions where slippage may occur between the brake and clutch members for slowing the action of the left hand wheel. The above operations apply not only when the shaft 31 is rotating in one direction for forward driving of the tractor but also apply when the shaft 31 is rotating in a reverse direction for a backward driving of the tractor. It is to be understood also that this mechanism is designed to drive both of the tractor wheels in the same direction at the same speed or at different speeds, or either of said wheels at a given speed while the other of said wheels is being held at a standstill for the purpose of pivoting. Inasmuch as pinions 20 and 21 are slidable they are made wider than gears 18 and 19 in order that the surfaces of engagement between them will be constant. It will be apparent from the above that the drive from the engine to the wheels comprises a main drive section including the alined shafts 31 and 44 and the reversing clutch mechanism 32 connected therebetween, and branch drive sections including clutch members 27 and 28 connected to the shaft 31 and the respective train of elements operatively connected thereto and leading to the respective wheels 6 and 7.

For the purpose of controlling the rotation of the shaft 31 for forward or rearward driving of the tractor the clutch mechanism 32 is used, which may be of any suitable construction, but which for the purpose of illustration is shown upon the drawings as a combined planetary transmission and clutch mechanism. The shaft 31 has keyed to it a pinion 40 in mesh with a set of planetary gears 41 idly rotatable on studs 42 fixed to the fly-wheel 43 fast with the crank shaft 44 of the engine 1. Rigid or integral with gears 41 are gears 45 of smaller pitch diameter, the gears 45 being in mesh with a gear 46 loosely and rotatably mounted on shaft 31. Rigid or integral with gear 46 is a clutch member 47, a mitre gear 48, a shipper sleeve 49 and a brake element 50. The rear end of the fly-wheel 43 has a clutch portion 51 cooperable with the clutch member 47, and the casing 16 has a fixed braking portion 52 cooperable with the brake member 50, while the sleeve 49 has a shipper groove 53 cooperable with a shipper fork or yoke 54. The bevel gear 48 is of utility to drive any suitable auxiliary device, such as a saw, through the medium of a belt running over pulley 55 (see Fig. 1) fast upon cross shaft 56 having a bevel pinion 57 fixed thereto and in mesh with the bevel gear 48. Suitable bearings 58 and 59, forming part of the engine casing or of the casing 16, are provided for the shaft 56.

The yokes 38, 39 and 54 are fastened to shafts 60, 61 and 62 respectively, shafts 60 and 61 having their ends suitably rotatably supported in the side walls of the casing 16 and the shaft 62 being rotatably supported in bearings 63 and 64 rigid with a cross-wall 65 of the casing 16 and engine frame. To shafts 60 and 61 are also fastened lever arms 66 and 67 carrying, at their outer ends, rollers 68 and 69 (see Figs. 1, 2, 3 and 4) bearing against cams 70 and 71 being preferably formed integral with the rein drums or sheaves 72 and 73 loosely and rotatably mounted on a cross shaft 74 having its ends rotatably supported in suitable bearings 75 and 76 formed in the side walls of the casing 16.

At an end of shaft 62 is fixed an arm 77 pivotally connected to a link 78 pivotally connected to a bell-crank lever 79 fulcrumed on a pivot 80 suitably supported on a fixed part of the casing 16, the free end of the lever 79 carrying a roller 81 adapted to contact with a cam 82 keyed to the shaft 74. The link 78 has a collar 83 secured to it and between which and the wall 65 of the casing 16, reacts a spring 84 normally operable to hold the clutch members 47 and 51 in engagement and the roller 81 against the cam 82 when being turned through its operating period.

From the above it will be apparent that as the cams 70, 71 and 82 are rotated they will act upon the arms 66 and 67 and the lever 79 to depress them (as viewed in Fig. 2 of the drawings), and hence move the yokes 38, 39 and 54 accordingly, to effect clutching operations at the proper time, of the clutches 25—27 and 26—28, and the unclutching of clutches 47—51, as above described. Interconnected between the yokes 38 and 39 is a spring 85 which normally acts to hold the clutches 25—27 and 26—28 disengaged and the brakes 22—24 and 23—24 in engagement.

For forward driving the clutch member 47 is engaged with the clutch portions 51 of the fly-wheel so that the clutch member 47 is differentially locked, by means of the planetary pinions 41—45 to the pinion 40 keyed to the shaft 31 and hence the shaft 31 is driven at the same speed as the crank shaft 44. For reverse drive, the swell on the cam 82 depresses the lever 79 to unclutch members 47 and 51 and to brake members 50—52 thus bringing clutch member 47 and the gear 46 to a stop. The fly-wheel will now carry the studs 42 and pinions 41 and 45 around therewith and owing to the difference in pitch diameters of the pinions 41 and 45, and to the riding of the pinions 45 on the stationary gear 46, the pinions 41 will effect a reverse driving of the pinion 40 keyed to the shaft 31.

Figure 4:
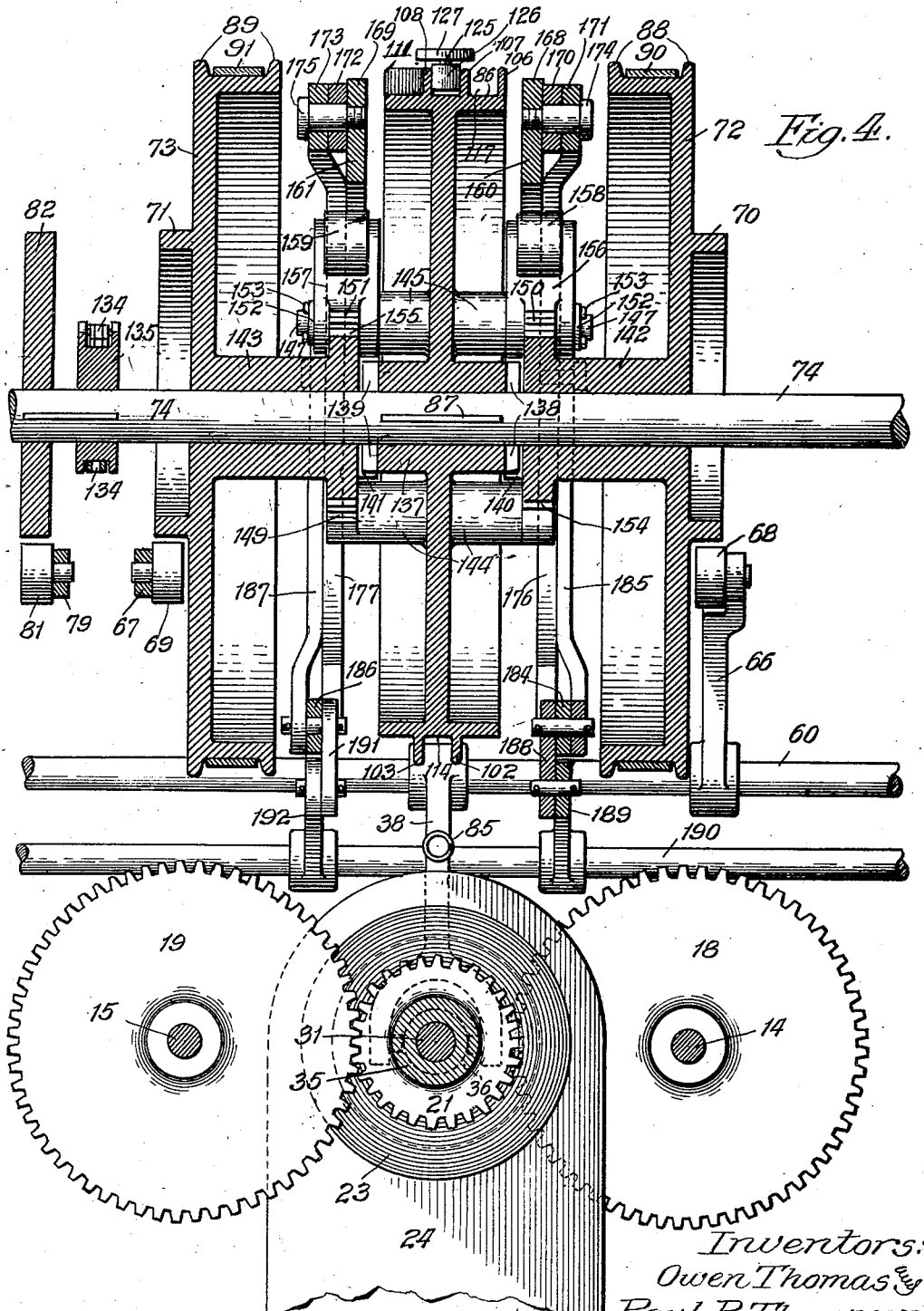
Fig. 4 is a transverse sectional view of the controlling mechanism and part of the driving mechanism.

The sheaves or rein drums 72 and 73 are preferably loosely or idly mounted upon the shaft 74 and between these drums or sheaves, upon the shaft 74, is located a control or gate member 86 which is made fast with the shaft 74 by means of a key 87, (see Fig. 4). The drums 72 and 73 are provided with peripheral flanges 88 and 89 between which ride reins 90 and 91. These reins are connected at the forward ends thereof to the drums by suitably providing such ends of the reins with rigid hooks 92 and 93, extending into suitable slots formed in the periphery of the drum between the flanges. The reins pass substantially around the drums and extend over swivelled and flanged idlers or pulleys 94, rotatably supported upon pintles 95 carried by a swivel sleeve 96 having a tubular portion 97 rotatably mounted in the upper wall of the casing 16. The sleeves have thrust flanges 98 and nuts 99 for holding the sleeves in place and also have hood portions 100 extending rearwardly over the reins, as clearly shown in Fig. 2 of the drawings. The reins extend rearwardly to the rear portion of the tractors, as to the driver's seat 101 on the attached implement. Each of the idlers or pulleys 94 has side flanges to guide the rein over the pulley and is freely rotatable about the pintle 95 while the tubular member 96 is freely rotatable in the upper wall of the casing 16 for swivelling about a vertical axis which is forward of the axis of the pintle. If the reins are pulled at an angle, to the left or to the right, depending upon a left or right cramp of the attached implement, the idlers will be self adjustable about the vertical axis of the swivel member 96 in accommodation of the direction of pull of the reins. In this way the reins will not tend to ride off of the idlers when the reins are pulled at an angle to the length of the tractor.

Figure 3:
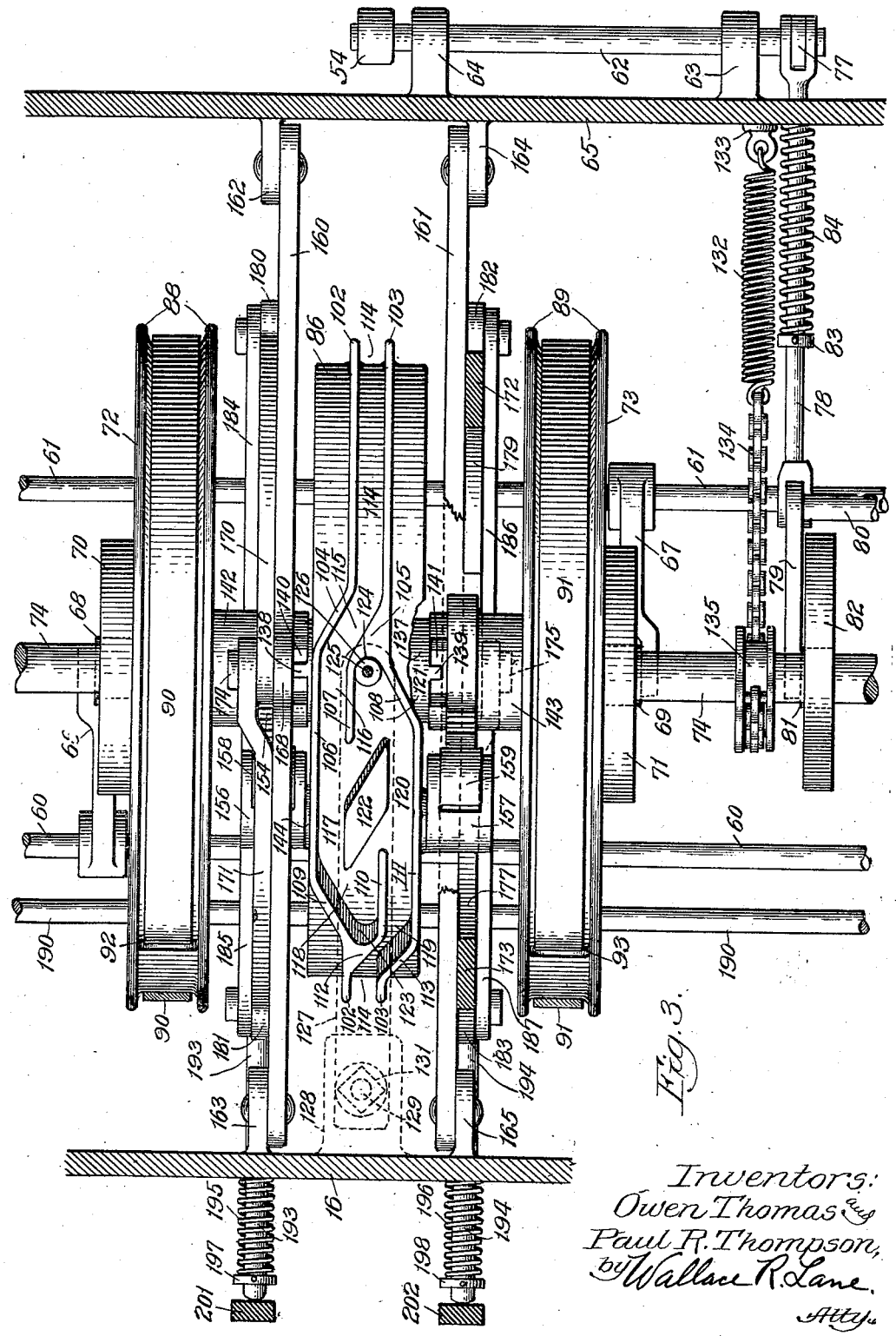
Fig. 3 is a top plan view, on an enlarged scale, of part of the controlling mechanism.

The control gate 86 is of generally cylindrical form and has spaced peripheral flanged portions 102, 103, 104, 105, 106, 107, 108, 109, 110, 111, 112 and 113 between which are formed race-way or channel portions 114, 115, 116, 117, 118, 119, 120, and 121 as clearly shown in Fig. 3 of the drawings. The channel 14 winds about the control gate member to a widened portion of area comprising the channel portions 117, 118, 120, and 121, and a switch member 122 of elongated form with tapered ends being generally disposed diagonally across the widened portion of the race-way between the flanged portions 106 and 111. The widened portion is also elongated and has tapered end portions 123 and 124 forming stops or turn-points for a stop member comprising a pin 125 carrying a roller 126, the pin 125 being carried at the free end of an arm 127 frictionally held at its other end, to a fixed bracket 128 rigid or integral with the casing 16. That part of the widened portion between stop ends 123 and 124 constitutes a neutral portion or zone within the range of which the pin 125 and roller 124 may relatively move without there being any operation of the driving mechanism, and the race-way portions 113, 114, 115 will constitute actuating portions for the roller and pin 125 to permit the desired operation of the driving mechanisms, as will later more fully appear. The friction device may be of any suitable construction such that the arm may be capable of lateral angular movement, but when moved will remain to where it has been moved, by reason of the frictional engagement of the parts, until positively acted upon by some other agent, such as the control gate in this case, the friction between the parts not being sufficient to prevent such latter movement of the arm. The parts are maintained in adjustable frictional engagement by a bolt 129, a washer 130 and nut 131, as clearly shown in Fig. 2 of the drawings.

For the purpose of returning the control gate 86 to its original or normal position after it has been rotated by a pull on the reins 90 and 91, a retractile spring 132 is connected at one of its ends to a fixed part 133 of the casing 16 and at its other end to a chain 134 passing over an elongated drum or sheave 135 made fast, as by keying, with the shaft 74, it being noted that this shaft is keyed to the control gate 86. The drum 135 is oval shape or elongated so that the leverage increases as the tension of the spring 132 decreases, as it contracts, and that the turning moment or effort may be constantly substantially uniform.

The hub 137, of the control gate and by which the gate is keyed to the shaft 74, has laterally extending clutch lugs 138 and 139 at both sides of the gate. These lugs extend into arc-shaped recesses of sector slots 140 and 141 provided in the adjacent ends of the hubs 142 and 143 formed integral with the drums 72 and 73, respectively. It will be noted that the lugs 138 and 139 are capable of a limited amount of angular play in the slots 140 and 141 before the lugs will contact with the ends of the slots. This construction provides for the drums 72 and 73 having relative angular movements when one rein is pulled and the other rein let-slack. Normally the lugs 138 and 139 are in mid-position in the slots, as shown in Fig. 3 of the drawings, relative movements of the drums and the gate being effected as above stated and as will later more fully appear. The amount of play allowed is such that either or both drums may be operated to effect some controls, such as the turning of the cams 70 and 71 in opposite directions.

The gate member 86 also has eccentrically related hubs 144 and 145 in which are rotatably supported two shafts 146 and 147. At the ends of the shaft 146 are keyed sector gears 148 and 149 and on the ends of the shaft 147 are idly mounted sector gears 150 and 151, suitable means such as washers 152 and cotter pins 153, being used to hold the sector gears 150 and 151 in place. The sector gears 149 and 151 are in mesh with a mutilated gear 155 formed integral with the hub portion 143 of the rein drum 73 and the gear 150 is in mesh with a mutilated gear 154 formed integral with the hub portion 142 of the rein drum 72, the gear 148 being in mesh with the gear 150 but out of mesh with the gear 154. This gearing is a differential and lock gearing for the cooperation of the drums with the gate member 86 as will later appear. The gears 150 and 151 have integral lever arms 156 and 157 carrying rollers 158 and 159, at their free ends, bearing against cam bars 160 and 161 located between the gate member 86 and the rein drums 72 and 73. These bars are stationary and are suitably fastened, at their ends, to brackets 162, 163, 164 and 165 forming rigid parts of the casing 16. These cam bars have curved or arc-shaped surfaces 166 and 167 concentric to the axis of the shaft 74 and against which may operate the rollers 158 and 159 of the sector gear arms 156 and 157.

The bars 160 and 161 may be formed with ears 168 and 169 to the former of which are pivotally connected a pair of substantially semi-circular cam bars 170 and 171 and to the latter of which are similarly connected like cam bars 172 and 173, the first pair being on the left side of the gate 86 and the second pair being on the right side of the gate 86, as viewed in Figs. 3 and 4 of the drawings. These bars hang pendulously from the pivot studs 174 and 175 securely threaded into the ears 168 and 169 and their lower ends abut together substantially in a vertical plane passing through the axis of the shaft 74. (See Fig. 8 of the drawings.) The bars 171 and 173 have inner cam surfaces 176 and 177 which, when the bars abut together at their lower ends, form continuations of the curved cam surfaces 166 and 167 respectively, but the bars 170 and 172 are differently curved so that the inner cam surfaces 178 and 179 thereof do not form smooth continuations of the cam surfaces 166 and 167 but are disposed less remotely from the axis of the shaft 74, so that the rollers 158 and 159, together with the arms 156 and 157 thereof will be moved inwardly as the rollers operate over the surfaces 178 and 179. The bars 170, 171, 172 and 173 are formed at intermediate side portions with apertured ears 180, 181, 182 and 183 to which are pivotally connected links 184, 185, 186 and 187, the links 184 and 185 extending downwardly toward each other and being pivotally connected together and to a link 188 pivotally connected to an end of a bell crank lever 189 freely fulcrumed upon a cross shaft 190 suitably supported at its ends in the side walls of the casing 16, and the links 186 and 187 likewise extending downwardly toward each other and being pivotally connected together to a link 191 pivotally connected to an end of a bell crank lever 192 freely fulcrumed on the cross-shaft 190. To the other ends of the bell crank levers 189 and 192 are pivotally connected plungers 193 and 194 slidably extending through suitable guide apertures provided in the rear wall of the casing 16. Suitable springs 195 and 196 may be provided to react between the rear wall of the casing 16 and collars 197 and 198 fast to the plungers 193 and 194 for normally holding them in rearwardly extended position and also for normally holding the bars 170, 171, 172 and 173, in separated condition, as shown in Fig. 7 of the drawings. These springs are not essential since the bars 170, 171, 172 and 173, when not operating for effecting a straightening out of a cramp, are free and movable by the rollers 158 and 159 together with arms 156 and 157, without in any way interfering with their movement. It is only when the plungers 193 and 194 are positively moved forwardly that bars 170, 171, 172 and 173 modify the normal radial movements of the rollers 158 and 159 with their arms 156 and 157.

For the purpose of operating the bars 170, 171, 172 and 173, for effecting a correction of a cramped hitch between the tractor and the implement attached to it, the rear wall of the casing 16 is provided with rigid or integral ears 199 and 200 to which are pivotally connected depending levers 201 and 202 normally bearing laterally against the ends of the plungers 193 and 194. The lower end portions of the levers 201 and 202 are so located that when the wye 203 of the frame 204 of the attached implement moves to the right or left, when there is a cramped hitch between the tractor and the attached implement, as shown for example, in the dotted line position thereof, in Fig. 1 of the drawings, the wye will press against the lever 201 or 202, as the case may be and move such lever forwardly. The lever 201 or 203, by reason of its contact with the end of plunger 193 or 194, will slide it forwardly to swing the bell-crank lever 191 or 192 to bring the bars 170 and 171 or 172 and 173 together or from the position shown in Fig. 7 to that shown in Fig. 8 of the drawings.

The attached implement shown comprises a frame 204 and a tongue 205 pivotally connected to king-bolts 206 and 207 arranged in vertical alignment and connected to ears 208 and 209 forming rigid or integral parts of the rear wall of the casing 16. The frame 204 is suitably connected to an axle 210 supported in wheels 211 and 212, the seat 101 being mounted upon a spring support 213 fastened to the axle housing.

For the operation of the device and assuming it first to be at a standstill with nothing in operation, and in the relation of the parts as shown on the drawings, the engine is first started in the usual manner. The crank shaft 44, mechanism 32 and propeller shaft 31 are operating in unison, the clutch members 27 and 28 running idle, the clutch member 47 being in engagement with the fly-wheel clutch portion 51, the brakes 22—24 and 23—24 being engaged, and brakes 50—52 being disengaged, as clearly shown in Fig. 2 of the drawings.

For the purpose of driving straight forward, the driver being seated on the seat 101 with the reins 90 and 91 in his hands, the driver pulls on both reins to effect a turning of the rein drums 72 and 73 and the gate 86, as well as the cams 70 and 71. The reins are not drawn full distance back unless it is desired to back up, the operation of which is later explained. It will be noted that at this point of operation the stop roll 126 is in abutment with the stop-end or turn-point 124, the spring 132 being effective to hold the end 124 against the roller 126. For forward driving the gate is caused to rotate (see Figs. 2, 3, and 9) sufficiently to move the switch 122 forward to the position where the stop roll 126 relatively travels away from the end 124 and against the forward inclined surface of the switch 122 and into the race-way portion 117, the arm 127 with the roller 126 being made to move laterally into the race-way portion 117 (see Fig. 3). A let-up on both reins will now permit the gate to reversely rotate by reason of the contraction of the spring 132 acting through the chain 134 and drum 135, so that the stop roller 126 will relatively travel along the channel portions 117, 115 and 114, it being noted that owing to the friction between the arm 127 and the fixed bracket 128, any tendency for the roller 126 returning to its original position will be resisted and prevented. The gate 86 will then rotate until the swells in the cams 70 and 71 depress the levers 66 and 67 whereby the yokes 38 and 39 operate to shift the clutch members 25 and 26 into engagement with the rotating clutch members 27 and 28, the gate ceasing to rotate as these clutch members come into full engagement. The brakes 22—24 and 23—24 it will be noted, have, in the meanwhile, become disengaged. With the clutches thus in, the pinions 20 and 21 are effective, through the driving gearing to the wheels 6 and 7, to drive them forwardly. During this operation and owing to the pull on the reins being equal, the differential gears remain locked, that is, they will have no differential effect, any tendency of gear 155 to turn gear 149 and shaft 146 being counteracted or counterbalanced by an equal tendency of the gear 154 to turn gear 148 and shaft 146 in the opposite direction, with the result of the shaft and gears being carried around with the gate 86, without the shaft 146 turning in its bearings and without the gears receiving relative motion. Fig. 5 shows the initial position of the gears. When the reins are first pulled to cause the roller 126 to be switched to race-way portion 117, the gears, as a whole, will move clockwise, as viewed in Fig. 5, to a position where the rollers 158 and 159 will be intermediate the ends of the surfaces 166 and 167. The movement of the rolls 158 and 159 from one end to the other end of the surfaces 166 and 167 respectively, is a neutral range of movements, during which the control mechainsm is in neutral condition and effects no change of control, except for switching the stop roller 126. This range of movement is the same for the relative movement of the roller 126 from stop end 124 to stop end 123. So long as the rollers 158 and 159 contact at any point of the surfaces 166 and 167, the differential gears are held in neutral or balanced condition, that is, they cannot have any differential effect, no matter if the reins be individually oppositely pulled, that is, if one rein be pulled and the other be let-up, or the two reins be see-sawed. This helps in rendering the apparatus fool-proof, and prevents improper operations if the operator becomes excited and suddenly pulls the reins in different directions or back and forth. Now, when the roller 126 is caused to move from race-way portion 117 to portion 114 the gearing will be rotated counter-clockwise as viewed in Figs. 5, 6, 7, and 8, from a position to the right of that shown in Fig. 5 to the position shown in dotted lines in Figs. 6, 7, and 8 of the drawings. After the rollers 158 and 159 pass from neutral range, that is, leave the ends of surfaces 166 and 167, they will remain in fixed radial relation, as shown, by reason of the differential gearing being in balanced condition. If, however, the driver were to pull on one rein only and to let-up on the other rein, then one roller would be free to move radially outwardly, providing the cramped-hitch cams do not interfere, as will be later explained, and the other roller will move radially inwardly. In such case the driving operation would be different for each bull wheel, as will later appear. When the reins are let-up equally, the gears and rolls will take the position shown in dotted lines in Fig. 6 of the drawings.

To bring the device to a stop the driver pulls on the reins to rotate the rein drums 72 and 73, the cams 70 and 71 and the gate 86, so that the stop roller 126 relatively travels back through race-way portions 114, 115, 117, 118 until the roller 126 comes to a stop against the stop end 123. A let-up in the reins will now permit the gate to rotate so that the roller 126 moves against the rear inclined end of the switch 122 and into the channel portions 120, 121 back to its original position against the stop end 124. In the meanwhile the cams 70 and 71 shall have turned to release the clutches 25—27 and 26—28 as well as apply the brakes 22—24 and 23—24, the spring 85 effecting such. It will be noted that the relative travel of the roller 126 from one stop end 124 to the other stop end 123, through the channel portions 117, 118, 120 and 121, is a neutral range of the operation of the device during which the driving gearing and the cams are inoperative or in neutral positions.

For straight backing up the reins may be drawn back to first bring the roller 126 to stop end 123 and then let-up until the roller 126 comes to race-way portion 120, or if in the above described operation the driver had desired to back up before returning to original conditions where the roller 126 had been permitted to return to stop end 124, he had let-up on the reins only sufficiently to bring the roller 126 to stop in the channel portion 120, a pull on the reins would have, or will now, cause a relative travel of the roller 126 through race-way portions 120, 119, 114 (at left hand side of Fig. 3). During this operation the swells on the opposite sides of the cams 70 and 71 turn to act on the arms 66 and 67 to effect a clutching operation, as before, for the driving mechanism, but also, in the meanwhile, the swell on cam 82 has rotated to move the bell crank lever 79 and hence effect an unclutching of the clutch 47—51, an applying of the brake 50—52 and a reversal of the rotation of the shaft 31 through the planetary transmission heretofore described. Accordingly, the bull wheels will be driven backwards. By reason of the pull on the reins being equal, the differential gears will remain in locked and balanced condition and will be carried around in clock-wise direction as viewed in Figs. 6, 7 and 8 of the drawings, to the position shown in full lines in Figs. 6, 7 and 8 of the drawings.

Figure 1:
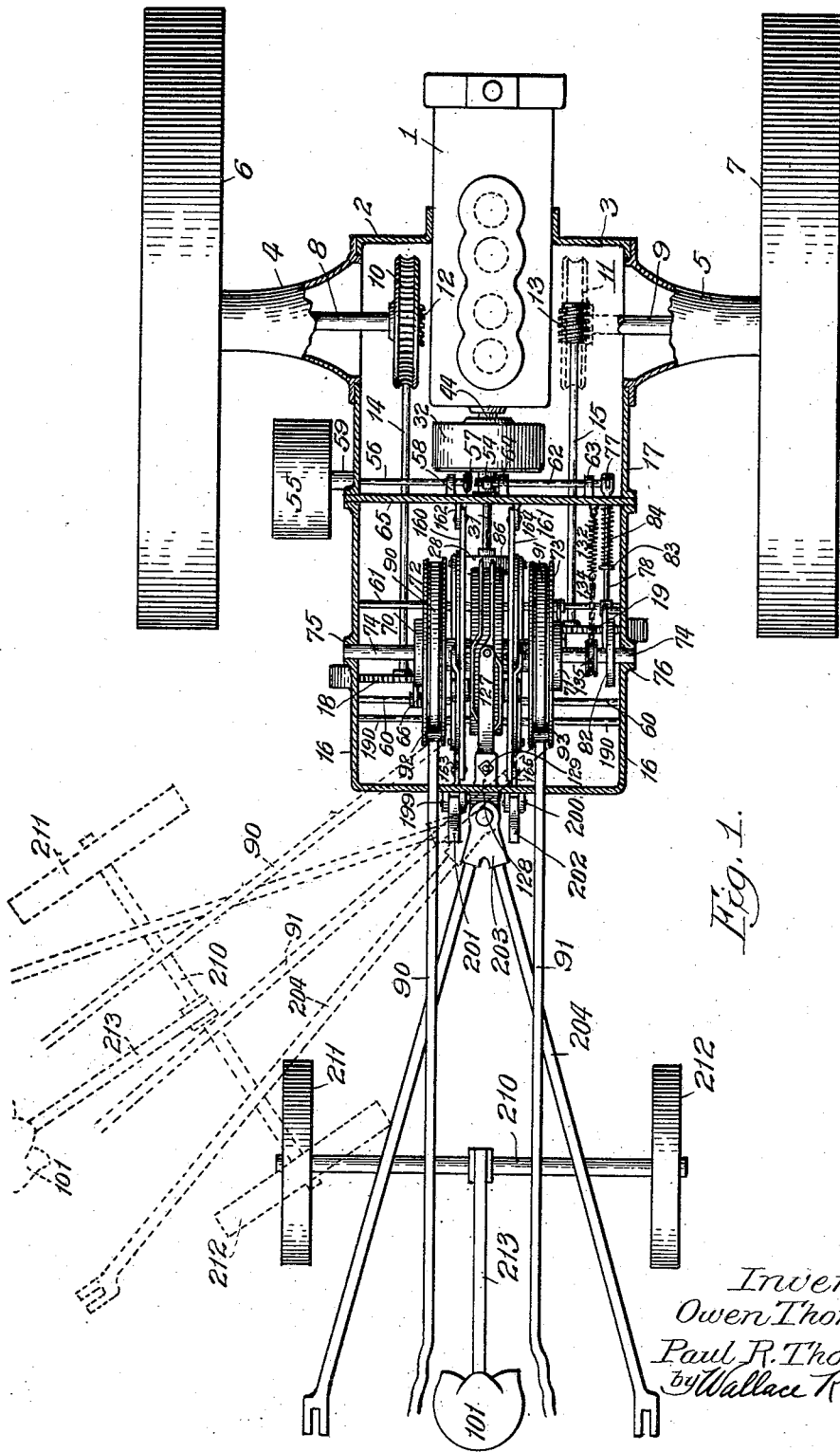
Fig. 1 is a top plan view of a tractor and an attached implement with part of the tractor casing shown in section.

When it is desired to turn to the right or left or to pull out of a left hand or right hand cramped-hitch between the tractor and the attached implement, a left hand cramped-hitch being shown in dotted lines position of a trailer in Fig. 1 of the drawings, either one or the other rein is pulled while the other rein is held still, or either rein, that is the opposite rein, may be let-up while the other rein is being held still, or both reins may be simultaneously moved in opposite directions. This is where the differential sector and mutilated gearing come into play as well as the angular play between the lugs 138 and 139 in the gate 86 and the sector slots 140 and 141 formed in the inner ends of the rein drum hubs 142 and 143.

Before going into the operation to make a right or left turn or pulling out of a cramped position, the locking action of the differential and the relative movements of the same with respect to the cam surfaces 166 and 167 will be described. When both reins were drawn to effect forward drive and both drums were rotated, the gears 154 and 155 both rotated in the same direction. The gear sectors 148, 149, 150 and 151 are so geared together that as gear 155 tends to rotate gear 149 in one direction the gear 154, through gear 150 tends to rotate the gear 148 in the opposite direction, and inasmuch as gears 148 and 149 are rigid with shaft 146, the gears are locked and there is no relative movement thereof and consequently the hub 144 together with the gate is rotated with the drums 72 and 73 as a unit. After such unit has been rotated to the position so that stop roller 126 is in channel portion 114, the rollers 158 and 159 shall have ridden off of the stop cam surfaces 166 and 167. Now, if either rein had been pulled before the rollers 158 and 159 had ridden off of surfaces 166 and 167, the gear 155 would have locked with gear 151 by reason of the arm 157 not being able to move outwardly, or the gear 154 would have locked with gear 150 so that arm 156 could not move outwardly, the surfaces 166 and 167 acting as stops therefor, and hence the gate would have been carried around with whichever drum 73 or 72 was rotated. But when the mechanism has been operated to full forward drive condition the differential shall have rotated to the position shown, as an example, in Fig. 6 of the drawings, where the bars 160 and 161 no longer stop the outward movement of the arms 156 and 157 if there be any differential effect imposed on the mechanism, as by pulling on one rein.

Therefore, assuming the mechanism to be in the forward driving condition and the desire to turn to the right, the right hand rein is drawn back while the left hand rein is left stationary. The rein drum 73 rotates, with the cam 71 and the multilated gear 155 which turns the gear 151 to move the arm 157 outwardly and at the same time turning the gear 149, as in a counter-clockwise direction as seen in Fig. 9 of the drawings. Gear 148 turns likewise causing gear 150 to turn and also ride over mutilated gear 154 which is stationary. The gate thus advances or turns at half the speed as the rein drum 73. These relative movements between the gate and drums are permitted by reason of the play between the studs 138, 139 and the shoulders at the ends of the sector slots 140 and 141, the shoulders acting as stops for the purpose of preventing the end teeth of the engaging gears becoming disengaged. During these movements the cam 71 has turned sufficiently to release the clutch 26—28 and apply the brake 23—24, so as to stop or partially stop the operation of the driving mechanism for the right hand bull wheel 7. If it is desired not to fully apply the brake 23—24, the pull on the right rein 91 may be regulated so that there will be some slippage in the brake 23—24 as well as in the clutch 26—28 so that the right hand wheel 7 will move at a slower speed than the left hand wheel 6, depending upon the radius of the turn desired to be made.

Similarly to make a left turn the left rein is pulled and drum 72 is rotated with mutilated gear 154 which turns sector gear 150 to move arm 156 outward and to rotate gear 148 in clockwise rotation, as viewed in Fig. 9 of the drawings. Gear 149 thus rides over the stationary mutilated gear 155 so that the gate turns at half the speed of the drum 72, the arm 157 swinging inwardly during such operation. Relative motion occurs between the lugs 138, and 139, and the sector recesses 140, 141 until the stop shoulders at the other ends of the recesses 140, 141 bring the lugs to a stop and hence prevent the gears from disengaging with each other. The cam 70 shall have turned sufficiently to release the clutches for the driving gear for the left hand wheel, slippage between the brake members and the clutch members being of utility to obtain whatever speed is desired in the left bull wheel, as in the operation above described regarding the right hand wheel.

It is to be noted that the lugs 138 and 139 are normally mid-way in the recesses 140 and 141 so that there is substantially equal play on both sides of the lugs. When the gate is in the non-driving position so that the rollers 158 and 159 are bearing against the cam surfaces 166 and 167, the lugs 138 and 139 are in mid-position. A pull or let-up on both reins does not cause the differential to operate but to remain locked and the arms 156 and 157 will remain in position, that is in balance, whether or not the rollers contact with the surfaces 166 and 167 and irrespective of the degree of turn of the gate and rein drums. If either rein is pulled or let-up, during the time the rollers 158 and 159 are in contact with surfaces 166 and 167, the differential gears remain locked and there still is no relative movement between the drums and gate, and hence between the lugs 138, 139 and the slots 140, 141. It is only when the rollers 158 and 159 are free from the surfaces 166 and 167, as shown in Fig. 6 of the drawings, that the lugs 138 and 139 move in the slots 140 and 141, during which time the arms 156 and 157 move in opposite direction, namely, one outwardly and the other inwardly. The driver may see-saw the reins by pulling one and letting up on the other with the only result of the differential operating and the arms 156 and 157 swinging back and forth and the rein drums turning or rotating back and forth to the extent of play between the lugs 138 and 139 and the ends of the slots 140 and 141 without moving the gate 86. The length of the surfaces 166 and 167 are designed to correspond with the range of relative movement of the stop roller 126 and the gate 86 between the stop ends 123 and 124, this range of play being a neutral range during which a pull or let-up on either rein will not affect the controls.

When desiring to back up, either to the right or to the left the reins may be manipulated, as before described, by drawing on both reins for a straight back up, then one or the other rein is let-up to effect the turn of one or the other drums 72 or 73, as the case may be, so that either cam 70 or 71 rotates to effect a release of the appropriate clutches in the driving gearing to the bull wheels, slippages, as before, being useful to effect a different speed of one wheel with respect to the other, or a total braking of either wheel may be effected. These operations are clear from the description made above without going further into details.

When the tractor and the implement attached to it get into a position where they are at an angle to each other, such as is shown in dotted lines of the drawings in Fig. 1, this condition is termed a cramp or cramp-hitch.

In order to be able to move out of a cramp we have provided the auxiliary cam bars 170, 171, 172 and 173 which are operative to automatically modify the action of the controlling mechanism for effecting a change in the driving gear. Assuming that the cramp is that shown in Fig. 1 of the drawings, the wye 203 will press against lever 201 which will move the plunger 193 inwardly to rock bell-crank lever 191 and thus to effect a closing of the bars 170 and 171. This brings the cam surfaces 176 and 178 of the cam bars into the path of movement of the roller 158 and arm 156 so that the arm 156 cannot move outwardly, or if already in outward position, it will be moved inwardly. When in this inward position, the cams 170 and 171 are so related that the right hand wheel 7 is being driven faster than the left hand wheel 6. As the cam surface moves the arm 156 inwardly the differential gears operate so that the arm 157 moves outwardly, gear 150 operating to turn gears 154 and 148 and gear 149 operating to turn gear 155 which in turn turns gear 151. As gears 154 and 155 turn together with their cams 70 and 71, the latter becomes effective to speed up the wheel 6 and to either drive the wheel 7 at a slower speed or hold it still. To pull out of a right cramp the wye 203 similarly moves plunger 194 and bars 172 and 173, so that bar 173 moves arm 157 inwardly to effect, through the differential, either a slower operation or a stopping of the wheel 6 and an increase of speed in wheel 7. The above assumes a forward driving and pulling or straightening out of cramps, the arms 156 and 157 being in the positions shown in full lines in Figs. 6, 7, and 8 of the drawings, that is, behind the shaft 74. When backing, the control mechanism is turned so that the arms 156 and 157 are in the dotted line positions shown in Figs. 6, 7, and 8 of the drawings, that is, forwardly of the shaft 74. The bars 170 and 172 are the ones that are useful to press or hold these arms inwardly when getting out of a backing cramp. As before, the wye 203 moves the plungers and the bars 170 and 172 push the arms 156 and 157 inwardly and, through the differential gears, the cams 72 and 73 are turned in opposite directions so that in a left cramp, as shown in Fig. 1 of the drawings, the wheel 7 is speeded up and the wheel 6 is retarded, and reversely so when in a right cramp.

While we have herein described and shown upon the drawings one form or embodiment of the invention, it is to be understood that the invention is not limited to the particular construction, details and arrangement of parts shown and described, but that other constructions, details and arrangements of parts are comprehended by the invention without departing from the spirit thereof.

Having now described our invention, we claim:—

1. A control mechanism for tractors having driving means, comprising a movable member having neutral and actuating portions, means connected to the driving means and said movable member for effecting different operations of the driving means upon different movements of the movable means, and means associated with said neutral and actuating portions of said movable member for effecting a limited movement within a neutral range of operations of the connecting means and driving means when the associated means cooperates with the neutral portion only, and to permit the unlimited movement of the movable member when associated with either of said actuating portions for permitting the operation of the driving means.

2. A control mechanism adapted for use with the driving mechanism of a tractor and comprising a movable control member having control and actuating portions cooperable with the driving mechanism for effecting different operations of the tractor, movable means cooperable with said control portion and acting in certain positions thereof to limit the movement of said member and in other positions thereof to permit unlimited movements of said member, said control portions having means whereby said member receives a reverse movement when effecting a change of driving operation.

3. A control mechanism adapted for use with the driving mechanism of a tractor and comprising a movable control member having control and actuating portions, means cooperable therewith and with the driving mechanism whereby said member has a neutral range of movement during which the driving operation of the tractor is ineffective, said control portions effecting different driving operations of the tractor, said member having means cooperable with said driving mechanism for receiving a reverse movement within its neutral range of movement when changing from one driving operation to another.

4. A tractor comprising a power unit and running gear, means connected to the power unit and the running gear for driving the tractor over the ground, controlling means rotatable about a single axis and having cams, and means cooperable with the driving means and said cams for selectively effecting forward, backward and turning driving operation of the tractor.

5. In a tractor having power means, the combination of means for steering the tractor, and means for automatically bringing the steering means into action when the angle between the tractor and an implement attached to the tractor reaches a predetermined angle to effect an increase of said angle.

6. In a tractor having power means, the combination of means for driving the tractor, means for steering the tractor, and means for automatically effecting a change in the steering operation of the tractor while the driving means continues to operate when the angle between the tractor and an implement attached to the tractor reaches a given angle.

7. A tractor comprising power means and means operated thereby to steer the tractor, means for attaching an agricultural implement to the tractor, and means for automatically bringing the steering means into action when the angle of hitch between the implement and the tractor reaches a predetermined angle for effecting an increase of said angle.

8. A tractor comprising a power unit, driving wheels, means connected to the power unit and the wheels for driving the wheels, control means connected to and controlling the operation of the driving means, means connected to the control means and operable upon a cramped-hitch between the tractor and an implement drawn thereby to automatically modify the action of the control means on the driving means, whereby the driving means operates to straighten out the cramped-hitch, said modifying means comprising independently movable members located in the path of the trailed implement when moving relative to the tractor on one or the other side thereof respectively.

9. In a tractor having driving power means, the combination of means for connecting the tractor to an agricultural implement, means for steering the tractor, means controlling the operation of said steering means, said controlling means comprising rein controlled members, cams cooperable therewith in one position of said cams to modify the action of said rein controlled members, means connected to the cams and located to be engaged by said implement when the angle between said implement and the tractor reached a given angle.

10. In a tractor having driving power means, the combination of means connecting the tractor to an agricultural implement, means for steering the tractor, rein controlled means for governing the operation of said steering means, said rein controlled means comprising a differential means having radially movable members, cams pivotally mounted on said tractor and adapted to be moved into the path of movement of said radially movable members, movable means connected to said cams and located to be operated by said implement when the angle between said tractor and said implement reaches a given angle.

11. In a tractor comprising a power unit, wheels and driving means therefor, control means for the driving means and comprising a pair of rein drums, cams movable with said drums, a control gate connected to said drums for movement therewith, means for limiting the movement of said gate at different positions upon different movements of said drum, and means connected to said driving means and operable by said cams to effect different operations of the driving means.

12. In a tractor comprising a power unit, wheels and driving means therefor, control means for the driving means and comprising a pair of rein drums, cams movable with said drums, a control gate having race-ways, a rider in said race-way, means in said race-way for moving said rider transversely of the direction of movement of the race-way, means holding said rider in moved position, said race-way having stop portions cooperable with said rider in different positions thereof for limiting the movement of the gate, said gate being connected to and movable with said drums, and means connected to said driving means and operable by said cams to effect different operations of the driving means.

13. In a tractor comprising a power unit, wheels and driving means therefor, control means for the driving means, and comprising a pair of rein drums, cams movable with the drums, a control gate, differential means connected to the drums and gate for effecting movement of said gate with or relative to said drums, means cooperable with said differential means for rendering the differential means ineffective to move said gate relative to the drums during a period of movement of the gate, and means connected to said driving means and operable by said cams to effect different operations of the driving means.

14. In a tractor comprising a power unit, wheels and driving means therefor, control means for the driving means and comprising a pair of rein drums, cams movable with the drums, a control gate, a loose connection between said gate and drums whereby said gate has a limited amount of movement relative to the drums upon different movements of the drums, and means connected to said driving means and operable by said cams to effect different operations of the driving means.

15. In a tractor comprising a power unit, wheels and driving means therefor, control means for the driving means and comprising a pair of rein drums, cams movable with the drums, a control gate, a loose connection between said gate and drums whereby said gate has a limited amount of movement relative to the drums upon different movements of the drums, differential means connected to the drums and gate for effecting movement of said gate with or relative to said drums, means cooperable with said differential means for rendering the differential means ineffective to move said gate relative to the drums during a period of movement of the gate, and means connected to said driving means and operable by said cams to effect different operations of the driving means.

16. In a tractor comprising a power unit, wheels and driving means therefor, control means for the driving means and comprising a pair of rein drums, cams movable with the drums, a control gate, a loose connection between said gate and drums whereby said gate has a limited amount of movement relative to the drums upon different movements of the drums, differential means connected to the drums and gate for effecting movement of said gate with or relative to said drums, and means connected to said driving means and operable by said cams to effect different operations of the driving means.

17. In a tractor comprising a power unit, wheels and driving means therefor, control means for the driving means and comprising rein controlled members, cams movable with said members, differential means connected to said members and operable to effect relative movements of the members, means operable upon a cramp in a hitch between the tractor and an implement attached to the tractor to automatically modify the operation of the differential means, and means connected to said driving means and operable by said cams to effect different operations of the driving means.

18. In a tractor comprising a power unit, wheels and driving means therefor, control means for the driving means and comprising rein controlled members, cams movable with said members, differential means connected to said members and operable to effect relative movement of the members, means operable upon a cramp in a hitch between the tractor and an implement drawn by the tractor to automatically modify operation of the differential means, said modifying means having movable cams operable by the trailed implement, and means connected to said driving means and operable by said cams to effect different operations of the driving means.

19. In a tractor comprising a power unit, wheels and driving means therefor, reversing means connected to the power unit and the driving means, control means for the driving means, clutch and brake members in said driving means operable to independently drive and brake each wheel, said control means being operable in certain positions to relieve said brake members and effect a clutching of the clutch members for driving the wheels at the same speed, and in another position to effect slippage in the brake and clutch members for driving the wheels at different speeds.

20. In a tractor comprising a power unit, wheels and driving means therefor, control means for the driving means, clutch and brake members in said driving means operable to independently drive and brake each wheel, said control means having rein control members movable in opposite directions and cooperable with the driving means to effect a driving operation of the wheels, a reversing mechanism for said driving means and connected to the power unit and the driving means, said control means cooperable with said reversing mechanism for reversing the operation of the driving means.

21. In a tractor comprising a power unit, wheels and driving means therefor, control means or the driving means, said driving means having a propelling shaft, clutch and brake members cooperable therewith, transmission means between the power unit and the shaft, said control means being connected to the transmission means and operable to effect a reverse operation of the transmission means and the shaft and having means for effecting an operative connection between the shaft and the driving means of the wheels.

22. In a tractor having a power unit, wheels and driving means therefor, control means for the driving means and comprising a pair of rein operative members and a gate member connected to said rein operative members, said gate member having a raceway and switch member, a stop member extending into said race-way in the path of movement of the switch member, and means connected to the control means and the driving means and being movable by the control means to effect an operation of the driving means.

23. In a tractor having a power unit, wheels and driving means therefor, control means for the driving means and comprising a pair of rein operated members, and a gate connected to said members, said gate having a race-way provided with switching portions, a stop member extending into the path of movement of said switching portions and being movable thereby to different positions, and means connected to the control means and the driving means and being movable by the control means to effect an operation of the driving means.

24. In a tractor having a power unit, wheels and driving means therefor, control means for the driving means and comprising a pair of rein operated members and a gate connected to said members, gears carried by said rein members, gears carried by said gate and differentially connected to each other and to the gears on the rein members, whereby the rein members may move relatively to each other, and means carried by the rein members for effecting the operation of the driving means when the rein members are moved.

25. In a tractor having a power unit, wheels and driving means therefor, control means for the driving means and comprising a pair of rein operated members, a gate provided with lugs extending into recesses provided in the rein controlled members, said gate and said rein controlled members having a limited amount of relative movement, a differential gearing carried by said gate and connected with said rein members, whereby the rein members may move relative to each other, and means operated by the rein members for effecting the operation of the driving means when the rein members are moved.

26. In a tractor having wheels, means driving the wheels and comprising a main driving section having reversing means for effecting a driving of the main driving section in opposite directions, branch driving sections operatively connected to the main driving section, a clutch and brake means in each branch driving section, and a line controlled device connected to said clutch and brake means and to said reversing means for effecting operative connection or braking of the branch driving sections and for effecting driving of the main driving means in either direction as desired.

27. A control mechanism for tractors having driving means, comprising a movable member having neutral and actuating portions, means connected to the driving means and said movable member for effecting different operations of the driving means upon different movements of the movable member, and means associated with said neutral and actuating portions of said movable member for effecting a limited movement within a neutral range of operation of the connecting and driving means when the associated means cooperates with the neutral portion only, and to permit the unlimited movement of the movable member when associated with either of said actuating portions for permitting the operation of the driving means, said neutral portion being located between said actuating portions whereby said associated means must cooperate with said neutral portion when the cooperation of said associated means is changed from one of said actuating portions to another thereof.

In witness whereof, we hereunto subscribe our names to this specification.

OWEN THOMAS.
PAUL R. THOMPSON.